United States Patent
Ng et al.

(10) Patent No.: US 10,392,521 B2
(45) Date of Patent: Aug. 27, 2019

(54) PARTICLE COMPOSITIONS FOR THREE-DIMENSIONAL PRINTING

(71) Applicant: Hewlett-Packard Development Company, L.P., Houston, TX (US)

(72) Inventors: Hou T. Ng, Campbell, CA (US); Ali Emamjomeh, San Diego, CA (US); Alejandro Manuel De Pena, Sant Cugat del Valles (ES); Edward Dale Davis, Poway, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 89 days.

(21) Appl. No.: 15/510,122

(22) PCT Filed: Sep. 30, 2014

(86) PCT No.: PCT/US2014/058341
§ 371 (c)(1),
(2) Date: Mar. 9, 2017

(87) PCT Pub. No.: WO2016/053305
PCT Pub. Date: Apr. 7, 2016

(65) Prior Publication Data
US 2017/0274594 A1    Sep. 28, 2017

(51) Int. Cl.
| | | |
|---|---|---|
| *B29C 64/135* | (2017.01) | |
| *B29C 64/35* | (2017.01) | |
| *B29C 64/386* | (2017.01) | |
| *B33Y 10/00* | (2015.01) | |
| *B33Y 30/00* | (2015.01) | |
| *B33Y 40/00* | (2015.01) | |
| *B33Y 50/02* | (2015.01) | |
| *B33Y 70/00* | (2015.01) | |
| *B33Y 80/00* | (2015.01) | |
| *C08K 3/36* | (2006.01) | |
| *C08L 75/04* | (2006.01) | |
| *C09D 7/61* | (2018.01) | |
| *C09D 201/00* | (2006.01) | |
| *B29C 64/165* | (2017.01) | |

(52) U.S. Cl.
CPC .............. *C09D 7/61* (2018.01); *B29C 64/165* (2017.08); *B29C 64/35* (2017.08); *B29C 64/386* (2017.08); *B33Y 10/00* (2014.12); *B33Y 30/00* (2014.12); *B33Y 40/00* (2014.12); *B33Y 50/02* (2014.12); *B33Y 70/00* (2014.12); *B33Y 80/00* (2014.12); *C08L 75/04* (2013.01); *C09D 201/00* (2013.01); *C08K 3/36* (2013.01)

(58) Field of Classification Search
CPC ......... C08K 3/36; C08L 75/04; B29C 64/165; B29C 67/0081; B29C 67/0088; B29C 67/0096; B29C 64/386; B29C 64/35; B33Y 10/00; B33Y 30/00; B33Y 30/40; B33Y 50/02; B33Y 70/00; B33Y 80/00; B33Y 40/00; C09D 7/61; C09D 201/00
See application file for complete search history.

(56) References Cited

U.S. PATENT DOCUMENTS

| | | | |
|---|---|---|---|
| 5,660,621 A | 8/1997 | Bredt | |
| 7,381,360 B2 | 6/2008 | Oriakhi et al. | |
| 7,767,735 B2* | 8/2010 | Koganehira | C09D 11/40 106/31.43 |
| 7,906,063 B2 | 3/2011 | Monsheimer et al. | |
| 8,449,809 B2 | 5/2013 | Monsheimer et al. | |
| 2006/0083694 A1* | 4/2006 | Kodas | B01J 13/0043 424/46 |
| 2007/0238056 A1 | 10/2007 | Baumann et al. | |
| 2008/0207821 A1* | 8/2008 | Weber | C08L 25/04 524/517 |
| 2009/0236775 A1* | 9/2009 | Monsheimer | C08G 69/36 264/460 |
| 2012/0142140 A1* | 6/2012 | Li | H01L 31/022425 438/98 |
| 2013/0026683 A1 | 1/2013 | Ng et al. | |
| 2014/0050921 A1 | 2/2014 | Lyons et al. | |
| 2017/0252974 A1* | 9/2017 | Ng | B29C 67/0081 |

FOREIGN PATENT DOCUMENTS

| | | |
|---|---|---|
| EP | 3116706 | 1/2007 |
| GB | 2493398 | 2/2013 |
| JP | 2002316363 | 10/2002 |
| KR | 20130013490 | 2/2013 |
| WO | WO-2014077848 | 5/2014 |

OTHER PUBLICATIONS

International Search Report and Written Opinion for International Application No. PCT/US2014/058341 dated Jun. 26, 2015, 12 pages.

* cited by examiner

*Primary Examiner* — Patrick D Niland
(74) *Attorney, Agent, or Firm* — HP Inc. Patent Department

(57) ABSTRACT

Provided in one example herein is a three-dimensional printing method, comprising: (A) forming a layer comprising particles comprising a polymer and cavities between the particles, wherein the particles have an average diameter of between about 5 μm and about 250 μm; (B) disposing a liquid suspension over at least a portion of the layer such that the liquid suspension infiltrates into the cavities, wherein the liquid suspension comprises a radiation-absorbing coalescent agent and nanoparticles having an average diameter of less than or equal to about 500 nm; (C) forming an object slice by exposing the infiltrated layer to a radiant energy, wherein the object slice comprises a polymeric matrix comprising the polymeric particles, at least some of which are fused to one another, and the nanoparticles within the polymeric matrix; and (D) repeating (A) to (C) to form the three-dimensional object comprising multiple object slices bound depth-wise to one another.

15 Claims, 7 Drawing Sheets

PARTICLE COMPOSITIONS FOR THREE-DIMENSIONAL PRINTING

BACKGROUND

Methods of fabricating three-dimensional ("3D") polymeric parts may include light area printing ("LAP"), selective laser sintering ("SLS"), inkjet binder sintering, fused deposition modeling ("FDM"), stereolithography ("SLA"), and digital light projection ("DLP") sintering. Final 3D parts produced from these methods often experience a reduction in physical dimensions of at least 5% (before compensation) during the fabrication process. The reduction is often due to the low density of the layers, which density generally ranges from 20 to 50%, and the rest of the layer volume is taken up either by a binder or the air voids.

BRIEF DESCRIPTION OF THE DRAWINGS

The drawings are provided to illustrate various examples of the subject matter described herein related to an ink composition and are not intended to limit the scope of the subject matter. The drawings are not necessarily to scale.

DETAILED DESCRIPTION

Figure 1:
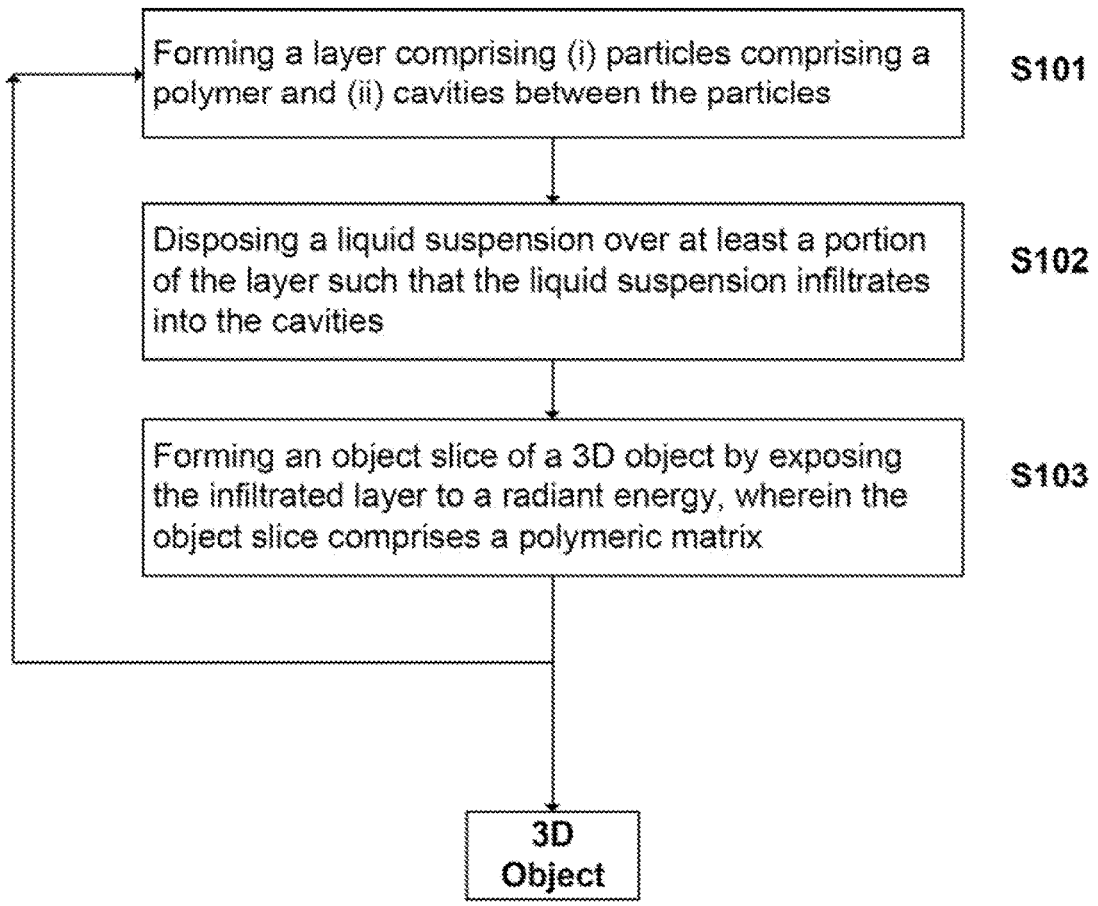
FIG. 1 provides a schematic flowchart illustrating one example of a 3D printing process described herein.

Following below are more detailed descriptions of various examples related to particle compositions for 3D printing, particularly a dense particle composition printed by 3D printing. The various examples described herein may be implemented in any of numerous ways.

Provided in one aspect of the examples is a three-dimensional ("3D") printing method, the method comprising: (A) forming a layer comprising (i) particles comprising a polymer and (ii) cavities between the particles, wherein the particles have an average diameter of between about 5 μm and about 250 μm; (B) disposing a liquid suspension over at least a portion of the layer such that the liquid suspension infiltrates into the cavities, wherein the liquid suspension comprises a radiation-absorbing coalescent agent and nanoparticles having an average diameter of less than or equal to about 500 nm; (C) forming an object slice of a 3D object by exposing the infiltrated layer to a radiant energy, wherein the object slice comprises a polymeric matrix comprising the polymeric particles, at least some of which are fused to one another, and the nanoparticles within the polymeric matrix; and (D) repeating (A) to (C) to form the 3D object comprising multiple object slices bound depth-wise to one another.

Provided in another aspect of the examples is a three-dimensional ("3D") printing method, comprising: (A) forming a layer comprising (i) mono-dispersed particles comprising a thermoplastic and (ii) cavities between the particles, wherein the particles have an average diameter of between about 10 μm and about 150 μm; (B) disposing an aqueous liquid suspension over at least a portion the layer such that the liquid suspension infiltrates into the cavities, wherein the liquid suspension comprises a radiation-absorbing coalescent agent and nanoparticles having an average diameter of between about 50 nm and about 500 nm; (C) exposing the infiltrated layer to a radiant energy, such that the coalescent agent absorbs the energy and fuses at least some of the particles in the infiltrated layer; (D) solidifying the exposed layer to form an object slice of a 3D object, wherein the object slice comprises a polymeric matrix comprising the fused particles and the nanoparticles within the polymeric matrix, and wherein the object slice is at least substantially free of the cavities; and (E) repeating (A) to (C) to form the 3D object comprising multiple object slices bound depth-wise to one another.

Provided in another aspect of the examples is a three-dimensional ("3D") printing system, comprising: a first device to form a layer; a second device to dispose a liquid suspension; an energy source to apply a radiant energy; and a controller to execute instructions to: cause the first device to form the layer comprising (i) particles comprising a polymer and (ii) cavities between the particles, wherein the particles have an average diameter of between about 5 μm and about 250 μm; cause the second device to dispose over at least a portion of the layer the liquid suspension such that the liquid suspension infiltrates into the cavities, wherein the liquid suspension comprises a radiation-absorbing coalescent agent and nanoparticles having an average diameter of less than or equal to about 500 nm; and cause the energy source to apply the radiant energy to the infiltrated layer to form an object slice of a 3D object, wherein the object slice comprises a polymeric matrix comprising the particles, some of which are fused to one another, and the nanoparticles within the polymeric matrix.

Polymeric Particles

The particles comprising the polymer in the aforementioned layer described herein may comprise any suitable material. These polymeric particles (or "particles" for short herein) may comprise mono-dispersed particles of the same size. The term "size" herein may refer to length, width, height, diameter, etc. Also, when referring to a plurality of objects, the value of any of the dimensions described herein may refer to a statistical average. The term "mono-dispersed" may refer to above at least 80% of the particles having the same size—e.g., at least about 85%, about 90%, about 95%, about 99%, about 99.5%, or higher. These particles may have the same chemical composition, or they may have multiple types of chemical compositions.

The particles may comprise any suitable polymeric material. For example, the particles may comprise a thermoplastic. Examples of suitable polymers for the particles include polyamide, polystyrene, polyethylene, polyacetal, polypropylene, polycarbonate, polyurethane, and blends of any two or more of the aforementioned and/or other polymers. In one example, the weight-average molecular weight of the polymer employed in the particles may range from about 25,000 to about 350,000. Other molecular weight values are also possible, depending on the polymer involved. In one example, the polymer comprises a polyamide having a weight-average molecular weight ranging from about 70,000 to about 300,000. The polymer may comprise, or be, a nylon, such as a high molecular weight nylon—e.g., polyamide ("PA") 12, polyamide 6, polyamide 8, polyamide 11, polyamide 66, and combinations thereof. For any of the polymers used in the polymeric particle composition, the polydispersity (i.e., the ratio of weight-average molecular weight to number-average molecular weight) may range from 1 to 4.

The particles may have a core-shell configuration. A core-shell polymer may include an internal polymer particle (i.e., the core) that has a coating or layer (i.e., the shell) disposed thereon. The core and shell of a single particle may comprise different polymers (which have similar or different molecular weights), or may comprise the same type of polymer with different molecular weights. In one example, the core comprises a polymer having a high weight-average molecular weight ranging from 70,000 to about 300,000, and the shell comprises a polymer having a low weight-average molecular weight ranging from about 25,000 to less than 70,000. Examples of suitable core polymers include nylons, such as high molecular weight nylons—e.g., polyamide 12, polyamide 6, polyamide 8, polyamide 11, polyamide 66, and combinations thereof. Examples of suitable shell polymer include low molecular weight nylons such as polyamide 12. When polyamide 12 is selected for both the core and the shell, it is to be understood that the weight-average molecular weight of the core ranges from about 70,000 to about 300,000, and the weight-average molecular weight of the shell ranges from about 25,000 to less than about 100,000. In another example, any of the low weight-average molecular weight polymers is selected as the core, and any of the high weight-average molecular weight polymers is selected as the shell. Examples of core-shell particles with different polymer type cores and shells include a shell of polyamide, and a core selected from polyether ketones, polycarbonates, acrylonitrile butadiene styrene (ABS) polymers, polyurethanes, and acrylic polymers.

The polymeric particles may have any suitable geometry, including size and shape. For example, the particles may be spherical, ellipsoidal, cubical, cylindrical, spiny, wire-like, sheet-like, flake-like, etc. The polymeric particles may have an irregular geometry. In one example, the polymeric particles described herein are spherical. The term "spherical" herein may encompass a shape that is a perfect sphere or almost spherical. The term "almost spherical" may refer to a shape that resembles a sphere but is not completely spherical, such as having a relatively small amount of irregularity deviating from a perfect spherical shape. Thus, a spherical particle herein may refer to a particle having a sphericity of at least about 0.80—e.g., at least about 0.85, about 0.90, about 0.95, or higher.

The particles in the pulverulent layer may have any suitable size. For example, the particles may have an average diameter in the micrometer range. For example, the particles may have an average diameter of at least about 1 µm—e.g., at least about 5 µm, about 10 µm, about 50 µm, about 100 µm, about 150 µm, about 200 µm, about 250 µm, about 300 µm, about 400 µm, about 500 µm, or larger. In one example, the particles have an average diameter of between about 1 µm and about 500 µm, between about 2 µm and about 400 µm, between about 5 µm and about 250 µm, between about 10 µm and about 200 µm, between about 20 µm and about 100 µm, etc. As described above, the particles may be mono-dispersed (with respect to size) and/or have the same chemical composition, or the particles may have multiple sizes (and/or size distributions) and/or chemical compositions.

The particles may be physically modified, so that the surface topography of the particles is altered. Physical modifications may be accomplished using a milling process, a precipitation process, and/or a spraying deposition process. In one example, the surface topography of the particles is modified so that nodules are present at the respective surfaces of the particles after the modification process is complete. Nodules are small protrusions/features that extend outward from the surface of a particle. Each nodule may have a diameter or an average diameter ranging from about 50 nm to about 5 µm. Not to be bound by any particular theory, but nodules present at the surfaces of the particles may increase the contact surface area of the particles with neighboring particles in the layer (disposed over a substrate) comprising the polymeric particles. As a result, the nodules may increase the efficiency of any sintering, fusing, curing process that is subsequently performed involving the particles.

The particles may be chemically modified, such as at the surface thereof. Chemical surface modifications may be performed to improve the wetting of the polymeric particles with subsequently deposited materials (i.e., to facilitate improved fluid interaction), and/or to enhance cross-linking between the particles during sintering, fusing, curing, etc., thereby enhancing the mechanical strength and elongation performance of the resultant 3D object.

The wetting angle of the polymeric particles may be modified to be less than 45°. This wetting angle may increase the ability of subsequently deposited material(s) to penetrate and infiltrate into the layer comprising the polymeric particles. A wetting angle of less than 45° may be achieved by introducing chemical building blocks, such as hydroxyl groups, onto the surface of the particles. In one example, hydroxyl groups is introduced onto the surface of the particles by treating the particles with hydroxyl-containing compounds, such as glycerol, pentanediol, hexanediol, and pentaerythritol.

When the polymeric particles include carboxylic acid and/or amino functional groups at the surface, chemical modification may take place through these functional groups. In one example, the polymeric particles including the carboxylic acid and/or amino functional groups at the surface may be treated with an amino compound having the general structure RNH R' XR", where R is H or an alkyl group with 1 to 18 carbon atoms; R' is a divalent linking group (such as an alkylene or arylene); XR" together is H, or X is selected from O, COO, OCO, CONH, NHCO, or CO, and R" is selected from H or an alkyl group with 1 to 18 carbon atoms. During the treatment of the particles with the amino compound, the corresponding salt(s) or amido group(s) may be formed on the surface of the particles. Not to be bound by any particular theory, but the addition of the salt(s) or amido group(s) at the surface of the particles may improve interlayer adhesion, enable better flow when the particles melt, and/or adjust the hydrophobicity of the 3D object that is formed.

The polymeric particles including the carboxylic acid and/or amino functional groups at the surface may be treated with an alcohol having the general structure of HOR'XR", where R' is a divalent linking group (e.g., an alkylene or arylene); XR" together is H, or X is selected from O, COO, OCO, CONH, NHCO, or CO and R" is selected from H or an alkyl group with 1 to 18 carbon atoms. During the treatment of the particles with the alcohol, an ester group may be formed on the surface of the particles. The addition of the ester group(s) at the surface of the particles may also improve interlayer adhesion, enable better flow when the particles melt, and/or adjust the hydrophobicity of the 3D object that is formed.

In another example, the polymeric particles including the amino functional groups at the surface are treated with chloro or alkoxy silanes. The general structure of a suitable silane is $YSi(R_2)R''$, where Y is Cl, $OCH_3$, or $OCH_2CH_3$; R is an alkyl or alkoxy group with 1 to 18 carbon atoms; and R'' is an alkyl group with 1 to 18 carbon atoms or an alkyl group with substituent groups having 1 to 18 carbon atoms. Similar to salt(s), amido group(s), and ester group(s), the addition of the silane group(s) at the surface of the particles may improve interlayer adhesion, enable better flow when the particles melt, and/or adjust the hydrophobicity of the 3D object that is formed.

The particles may be present in the form of a powder, a liquid, a paste, or a gel. Examples of the polymer in the particles include semi-crystalline thermoplastics with a processing window of greater than 5° C.—i.e., the temperature range between the melting temperature and the re-crystallization temperature). In an example, the processing window ranges from 15° C. to about 30° C. Some examples of the polymer include polyamides—e.g., nylon or PA 11 ("PA-11"), nylon or PA 12 ("PA-12"), nylon or PA 6 ("PA-6"), nylon or PA 8 ("PA-8"), nylon or PA 9 ("PA-9"), nylon or PA 66 ("PA-66"), nylon or PA 612 ("PA-612"), nylon or PA 812 ("PA-812"), nylon or PA 912 ("PA-912"), etc. Other examples of the polymer include polyethylene, polyethylene terephthalate (PET), and amorphous variation of these materials. Other examples of suitable polymer includes polystyrene, polyacetal, polypropylene, polycarbonate, polyester, thermal polyurethane, other engineering plastic, and blends of any two or more of the polymers listed herein. Core-shell polymeric particles of these materials may also be used.

The polymer in the particles may have a melting temperature of any suitable value, depending on the material involved. For example, the melting temperature may range from about 50° C. to about 400° C. In one example, it is desirable that the melting temperature of the polymer be lower than the melting temperature of an inorganic salt used in the modifier agent (which is described further below), should such a modifier agent be present. For example, polyamide 12 having a melting temperature of about 180° C. may be employed, or polyurethanes having a melting temperature ranging from about 100° C. to about 165° C. may be employed. When polymeric particles comprising a combination of different types of polymers are employed, at least one of the particles has a melting temperature below the melting temperature of the inorganic salt in the modifier agent. In one example, each of the plurality of polymeric particles has a melting temperature below the melting temperature of the inorganic salt.

The layer comprising the polymeric particles may additionally comprise a charging agent, a flow aid, or combinations thereof. A charging agent may be added to suppress tribo-charging. Examples of a suitable charging agent include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In one example, the charging agent is added in an amount ranging from greater than 0 wt % to less than 5 wt % based upon the total wt % of the particles. Other amount of the charge agent is also possible.

Flow aid(s) may be added to improve the coating flowability of the polymeric particles. Flow aid(s) may be desirable when the particles have an average diameter of less than about 25 µm in size. The flow aid may improve the flowability of the polymeric particles by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In one example, the flow aid is added in an amount ranging from greater than 0 wt % to less than 5 wt % based upon the total wt % of the particles.

Coalescent Fluid

The coalescent fluid described herein to facilitate forming a 3D object may comprise a liquid suspension. The liquid suspension may contain any suitable number of components. For example, the liquid suspension of the coalescent fluid may contain a coalescent agent. The coalescent agent may be energy-absorbing, such as radiation-absorbing. The energy may refer to radiant energy. Examples of the suitable liquid suspension described herein include an aqueous dispersion containing at least one coalescent agent. The radiation-absorbing agent may be an infrared light absorber, a near infrared light absorber, or a visible light absorber.

Absorption herein may refer to attenuation of the energy of a beam (light, electrons, etc.) on passage through a matter. The dissipated energy as a result in this instance may be converted into other forms of energy (e.g., heat). An absorber may refer to a piece of matter, or body, intended to absorb radiation. An absorber herein may absorb all of, or a major proportion of, radiation in the region from 100 nm to 1 mm. The radiation may be non-monochromatic and/or non-coherent and/or non-oriented, of wavelength from 100 nm to 1 mm, such as via a radiative heater or any other energy source described in this disclosure herein. In one example of an LAP method, a coalescent agent acts as an absorber to absorb the energy and dissipate it in the form of heat to its surrounding particles in the pulverulent layer. Such a process may allow a larger number of materials to be used than a sintering-based (e.g., laser sintering) process. In one example, the polymeric particles in the pulverulent layer generally are incapable, or insufficiently capable, of absorbing the radiation from the radiation energy source. "Insufficiently" in this context refers to that absorption of radiation via an energy source of a wavelength from 100 nm to 1 mm does not heat the pulverulent layers sufficiently to enable it to bond via fusion or sintering to adjacent pulverulent layer particles, or that the time needed for this is impractically long. In one example, the absorption herein may refer to a subset of the 100 nm to 1 mm range—e.g., between about 700 nm and about 1400 nm.

The coalescent agent may be a pigment-based or a dye-based ink. In one example, the ink may comprise visible light enhancer(s) as the active agent. As one example, the coalescent agent is an ink-type formulation including carbon black, such as, for example, the ink formulation commercially known as CM997A available from Hewlett-Packard Company. Examples of inks including visible light enhancers are dye-based colored inks and pigment-based colored inks, such as the commercially available inks CE039A and CE042A, available from Hewlett-Packard Company. Not to be bound by any particular theory, but the aqueous nature of some coalescent agent may enable the coalescent agent to penetrate and infiltrate the base layer comprising polymeric particles. For hydrophobic polymeric particles the presence of a co-solvent and/or a surfactant in the coalescent agent may assist in obtaining the desired wetting. One or more coalescent agent may be dispensed to form each object slice (of the final resultant 3D object).

The coalescent agent may comprise water soluble near-infrared absorbing dyes with absorptions in the range of about 800 nm to about 1400 nm as the main component in the coalescent agent. In one example, the fusing lamp in an LAP process emits radiation energy (e.g., light) over the about 800 nm to about 1400 nm range. In one example, using a near-IR ("NIR") absorbing dye as the coalescent agent (or a part thereof) may overcome a challenge of creating a resultant product that is black or grey in color and has poor visual uniformity (or optical density), sometimes as a result of using carbon black. An NIR absorbing dye may achieve the desired fusing efficiency and improve the color uniformity. In one example, the maximum emissive light occurs around 1100 nm and quickly forms a tail end. Thus, in this example in order to maximize the absorptions, the dyes employed should have similar absorption range for maximum efficiency. In addition, colored parts with a wide spectrum of color gamut may be obtained with incorporation of colored pigments and dyes. In one example, solvent soluble dyes in the absorption range of about 800 nm to about 1400 nm are dispersed with surfactants. Presence of such surfactant (additives) may impact the thermal properties of the base polymeric particle pulverulent layer, thus affecting the quality (e.g., mechanical properties) of the resultant 3D object. Thus, in one example water soluble dyes or compounds that have absorptions in the about 800 nm to about 1400 nm range are employed as to increase, or even maximize, the absorption of fusing emissive lamp. These dyes may be washed off at the end so that the surface of the part does not contain any residual dyes. In one example, the coalescent agent is an organic near-infrared dyes, which are stable in the ink formulation.

The NIR dyes may be any of the suitable commercially available NIR dyes and maintain their solubility in the presence of co-solvent in the designated ink vehicles. In one example, experiments with nylon and thermoplastic polyurethane ("TPU") powder particles using the NIR dyes as a coalescent agent show these dyes as strong heat generators upon exposure to a fusing lamp, similar to the process with carbon black based ink as a coalescent agent.

The amount of coalescent needed to achieve good powder fusing may be of any suitable value, depending on the material involved. In one example, the amount is in the range of about 0.5 wt % to about 8 wt % with respect to the powders—e.g., about 1 wt % to about 6 wt %, about 2 wt % to about 4 wt %, etc. Other values are also possible. In one example, with a concentration of less than about 2.5 wt %, the final object obtained resembles closely the nature white color of nylon or TPU powders. In one example, these dyes are formulated into water-based inkjet ink dispersions and show reasonably good jetting performance. In one example, to obtain colored 3D objects, various colored organic and/or inorganic pigments are added to the ink/coalescent fluid dispersions so that they may be introduced during the layer-by-layer fabrication process. In another example, primary color inkjet ink pens may be used for generating colored objects in addition to the pen with near infrared dyes.

The coalescent agent may contain carbon black (pigment). The carbon black pigment may act as a radiation absorbing agent or active material. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Colombian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

The carbon black pigment may be polymerically dispersed in the coalescent agent by a polymeric dispersant having a weight average molecular weight ranging from about 12,000 to about 20,000. In some of the examples disclosed herein, the carbon black pigment is initially in the form of a water-based pigment dispersion. The water-based pigment dispersion includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the water-based pigment dispersion, a ratio of the carbon black pigment to the polymeric dispersant ranges from about 3.0 to about 4.0. In an example, the ratio of the carbon black pigment to the polymeric dispersant is about 3.6. It is believed that the polymeric dispersant contributes to the carbon black pigment exhibiting enhanced electromagnetic radiation absorption.

The amount of the carbon black pigment that is present in the coalescent agent may range from about 3.0 wt % to about 6.0 wt % based on the total wt % of the coalescent agent. In other examples, the amount of the carbon black pigment present in the coalescent agent ranges from greater than 4.0 wt % up to about 6.0 wt %. Not to be bound by any particular theory, but these pigment loading levels may provide a balance between the coalescent agent having jetting reliability and electromagnetic radiation absorbance efficiency. When the carbon black pigment is present in the water-based pigment dispersion, the amount of the water-based pigment dispersion that is added to the coalescent agent may be selected so that the amount of the carbon black pigment in the coalescent agent is within the given ranges.

The coalescent agent may comprise an anti-kogation agent. Kogation refers to the deposit of a dried ink (e.g., coalescent agent) on a heating element of a thermal inkjet printhead. Anti-kogation agent(s) may be included to assist in preventing the buildup of kogation. Examples of suitable anti-kogation agents include oleth-3-phosphate (e.g., commercially available as CRODAFOS® O3A or CRODAFOS® N-3 acid from Croda), or a combination of oleth-3-phosphate and a low molecular weight (e.g., <5,000) polyacrylic acid polymer (e.g., commercially available as CARBOSPERSE® K-7028 Polyacrylate from Lubrizol). Whether a single anti-kogation agent is used or a combination of anti-kogation agents is used, the total amount of anti-kogation agent(s) in the coalescent agent may range from greater than 0.20 wt % to about 0.62 wt % based on the total wt % of the coalescent agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

The coalescent agent may also include a chelator, a biocide/anti-microbial, and/or combinations thereof. The chelator may be added in any amount ranging from about 0.03 wt % to about 0.10 wt % based on the total weight of the coalescent agent. An example of a suitable chelator includes TRILON® (an aminopolycarboxylate, available from BASF Corp.). The biocide or antimicrobial may be added in any amount ranging from about 0.30 wt % to about 0.40 wt % with respect to the total weight of the coalescent agent. Examples of suitable biocides/anti-microbials include PROXEL® GXL (an aqueous solution of 1, 2-benzisothiazolin-3-one, available from Arch Chemicals, Inc.) and KORDEK® MLK (a formaldehyde-free microbicide from the Dow Chemical Co.).

The liquid suspension of the coalescent fluid may contain nanoparticles. The nanoparticles may have any suitable geometry, including shape and size. For example, the nanoparticles may have the same shape as any of the aforedescribed shapes of the polymeric particles. The nanoparticles may have a different shape from the polymeric particles. In one example, the nanoparticles are spherical.

The nanoparticles may have an average diameter in the nanometer range. For example, the average diameter may be less than or equal to about 600 nm—e.g., less than or equal to about 500 nm, about 400, about 300 nm, about 200 nm, about 100 nm, about 50 nm, about 20 nm, about 10 nm, or smaller. In one example, the nanoparticles have an average diameter of between about 10 nm and about 500 nm—e.g., about 20 nm and about 400 nm, about 30 nm and about 300 nm, about 40 nm and about 200 nm, about 50 nm and about 100 nm, about 60 nm and about 80 nm, etc. Other diameter values are also possible. In one example, the nanoparticles have an average diameter of between about 50 nm and about 250 nm.

The nanoparticles may be present in the liquid suspension at any suitable amount—i.e., at a loading level of any suitable value. For example, the nanoparticles may be between about 1 wt % and about 50 wt % of the liquid suspension—e.g., about 2 wt % and about 40 wt %, about 5 wt % and about 30 wt %, about 10 wt % and about 200 wt %, etc. Other values are also possible. In one example, the nanoparticles are present at between about 5 wt % and about 25 wt %.

The nanoparticles may comprise any suitable material. The nanoparticles may comprise the same material as that of the aforedescribed polymeric particles. For example, the nanoparticles may comprise the same polymer as the polymeric particles. The nanoparticles may comprise a different material from that of the polymeric particles. For example, the nanoparticles may comprise an inorganic material. The inorganic material may comprises a ceramic, including an oxide, a carbide, a nitride, an oxynitride, and the like. In one example, the inorganic material includes at least one of silica, alumina, titania, zinc oxide, tungsten carbide, and the like. The nanoparticles may comprise a metal, such as a transition metal, a noble metal, etc.; or the nanoparticles may comprise a metal alloy.

The liquid suspension may additionally comprise at least one coalescence modifier agent. A suitable coalescence modifier agent may separate individual polymeric particles to prevent the particles from joining together and solidifying as part of an object slice. Examples of a coalescence modifier agent include colloidal, dye-based, and polymer-based inks, as well as solid particles that have an average size less than the average size of the polymeric particles descried herein. The molecular mass of the coalescence modifier agent and its surface tension may be such that it enables the agent to penetrate sufficiently into the polymeric particles and infiltrate into the cavities between the particles to achieve the desired mechanical separation. In one example, a salt solution is employed as a coalescence modifier agent. In another example, inks commercially known as CM996A and CN673A available from Hewlett-Packard Company are employed as a coalescence modifier agent.

Suitable coalescence modifier agents may act to modify the effects of a coalescent agent by preventing polymeric particles from reaching temperatures above its melting temperature during heating. A fluid that exhibits a suitable cooling effect may be used as this type of coalescence modifier agent. For example, when polymeric particles is treated with a cooling fluid, energy applied to the polymeric particles may be absorbed, evaporating the fluid to help mitigate, minimize, or even prevent polymeric particles from reaching their melting temperature(s). Thus, for example, a fluid with a high water content may be a suitable coalescence modifier agent.

Other types of coalescence modifier agents may be used. An example of a coalescence modifier agent, which may increase the degree of coalescence, may include, for example, a plasticizer. Another example of a coalescence modifier agent, which may increase the degree of coalescence, may include a surface tension modifier to increase the wettability of the polymeric particles.

The modifier agent may act to mitigate, minimize, or even prevent thermal bleed, such as to improve the surface quality, of the object slice and/or the final resultant 3D object. For example, the modifier agent may include an inorganic salt, a surfactant, a co-solvent, a humectant, a biocide, and water. In one example, the modifier agent consists of these components. It has been found that this particular combination of components may effectively reduce or prevent coalescence bleed, at least in part because of the presence of the inorganic salt. In one example, an inorganic salt employed in the modifier agent has a relatively high heat capacity, but a relatively low heat emissivity. These characteristics may render the modifier agent capable of absorbing the radiation (and its associated thermal energy) applied thereto, and also capable of retaining a bulk of the thermal energy therein. As such, very little, if any, of the thermal energy may be transferred from the modifier agent to the polymeric particles.

In addition, the aforementioned inorganic salt may have a lower thermal conductivity and/or a higher melting temperature than the thermal conductivity and/or melting temperature of the polymeric particles, and, in some instances, of the active material in the coalescent agent. In one example, upon absorbing radiation and thermal energy, the inorganic salt does not melt and also does not transfer a sufficient amount of heat to the surrounding polymeric particles. As a result, in this example the modifier agent effectively reduces curing/fusing of the polymeric particles when polymeric particles are in contact with both the coalescent agent and the modifier agent, and prevent curing when the polymeric particles are in contact with the modifier agent alone.

An inorganic salt in the modifier agent may be water soluble. Examples of a suitable water soluble inorganic salt include sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof. The inorganic salt may be present in an amount ranging from about 5.0 wt % to about 50 wt % with respect to a total weight of the modifier agent. Other values are also possible.

The modifier agent may also include a surfactant. The type and amount of the surfactant may be selected so that a contact angle thereof with the polymeric particles is less than 45°. The components of the modifier agent may be mixed together, and then the amount of surfactant adjusted to achieve the desirable contact angle. In one example, a suitable amount of surfactant to achieve the desired contact angle ranges from about 0.1 wt % to about 10 wt % with respect to the total weight of the modifier agent. Examples of suitable surfactants include tetraethylene glycol, ethylene glycol 1 (e.g., LIPONIC® EG-1 from Lipo Chemicals, Inc., NJ. USA), a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL® FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants with a hydrophilic-lipophilic balance ("HLB") less than 10 include non-ionic wetting agents and molecular defoamers (e.g., SURFYNOL® 104E from Air Products and Chemical Inc.) or water-soluble, non-ionic surfactants (e.g., TERGITOL® TMN-6 from The Dow Chemical Company). A fluorosurfactant may also be added to the surfactant having the HLB less than 10 in order to improve the wetting of the build material. As such, in another example, the coalescent includes a combination of the surfactant with the HLB less than 10 (e.g., the self-emulsifiable surfactant based on acetylenic diol chemistry) and a non-ionic fluorosurfactant (e.g., CAPSTONE® FS-35 from DuPont). The surfactant may contribute at least in part to filling the cavities between the polymeric particles in the layer.

Whether a single surfactant is used or a combination of surfactants is used, the total amount of surfactant(s) in the coalescent agent may range from about 0.5 wt % to about 1.4 wt % based on the total wt % of the coalescent agent, and in some instances, the coalescent fluid. In an example, the surfactant having the HLB less than 10 is included in an amount ranging from about 0.5 wt % to about 1.25 wt %, and the fluorosurfactant is included in an amount ranging from about 0.03 wt % to about 0.10 wt %.

As noted above, the modifier agent may include a co-solvent, a humectant, and a biocide. In one example, a co-solvent is present in an amount ranging from about 1.0 wt % to about 32 wt %, a humectant in an amount ranging from about 0.1 wt % to about 15 wt %, and a biocide in an amount ranging from about 0.01 wt % to about 5 wt %, each of which is with respect to the total weight of the modifier agent. Other values are also possible. Suitable co-solvents include 2-hydroxyethyl-2-pyrollidinone, 2-pyrollidinone, 1,6-hexanediol, and combinations thereof. Suitable humectants include Di-(2-hydroxyethyl)-5,5-dimethylhydantoin (e.g., DANTOCOL® DHF from Lonza, Inc.), propylene glycol, hexylene glycol, butylene glycol, glyceryl triacetate, vinyl alcohol, neoagarobiose, glycerol, sorbitol, xylitol, maltitol, polydextrose, quillaia, glycerin, 2-methyl-1,3-propanediol, and combinations thereof. The co-solvent may have a boiling temperature of less than or equal to about 300° C. In some examples, the co-solvent has a boiling temperature of less than or equal to about 250° C. Some examples of the single co-solvent include 2-pyrrolidinone, 1,5-pentanediol, triethylene glycol, tetraethylene glycol, 2-methyl-1,3-propanediol, 1,6-hexanedol, and tripropylene glycol methyl ether. The coalescent agent may include one of the listed co-solvents alone, or two or more of the listed co-solvents in combination, and excludes other co-solvents. In one example, if the co-solvent is 2-pyrrolidinone, the co-solvent 2-pyrrolidinone alone is included. In another example, if the co-solvent is a combination of 2-pyrrolidinone and 1,5-pentanediol, these solvents alone are included.

Suitable biocides may include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from the Dow Chemical Co.).

The coalescent agent may include water (e.g., deionized water), a co-solvent having a boiling temperature less than 300° C., a surfactant having an HLB of less than 10, and a polymerically dispersed carbon black pigment. The amount of water in the coalescent agent may vary depending upon the amounts of the other components, but the water makes up a balance of the coalescent agent (i.e., a total wt % of the coalescent agent is 100).

3D Printing 3D printing is a printing process that may be employed to fabricate (solid) 3D objects from a digital model. 3D printing may be employed in rapid product prototyping, mold generation, and mold master generation. 3D printing techniques are often considered additive manufacturing processes because they may involve the application/generation of successive layers of material. An additive manufacturing process differs from other machining processes that rely upon the removal of material to create the final object. Materials used in 3D printing often need (e.g., fusing), which for some materials may be accomplished using heat-assisted extrusion or sintering, and for other materials may be accomplished using digital light projection technology.

As described above, one example of 3D printing is LAP. An LAP method may involve any suitable process(es). LAP may have lower cost and achieve faster throughput with good accuracy and roughness, in comparison to a sintering technique.

In one example, LAP involves layer by layer deposition of polymeric particles (e.g., nylon and/or thermoplastic polyurethane ("TPU"), etc.) of any suitable size(s). In this example, these particles (in the pulverulent layers) are pre-heated close to about 150° C., and then a coalescent agent (e.g., carbon black), along with nanoparticles, in a liquid suspension coalescent fluid is selectively disposed over the region in a layer where the object is to be formed. Then the whole layer is exposed to high intensity fusing lamp(s) with emissive wavelength of between about 900 nm and about 1400 nm to be absorbed by the coalescent agent. The absorbed energy then transformed to thermal energy. During this time, the polymer powder particles may be melted or sintered by raising its temperature close to their melting temperature as a result of this transformation. The next pulverulent layer (of the polymeric particles) is layered on top of the underlying layer, and the process is repeated till the desired final 3D object is formed. In this example, the final object is either black or grey colored due to the presence of carbon black; but the color of the final object may be different if a different pigment/dye is used.

FIG. 1 illustrates one example of the processes in one LAP method. In this example, a layer comprising (i) particles comprising a polymer and (ii) cavities between the particles is formed (S101). The particles may have an average diameter of between about 5 µm and about 250 µm. Subsequently, a liquid suspension is disposed over at least a portion of the layer such that the liquid suspension infiltrates into the cavities (S102). The liquid suspension may comprise a radiation-absorbing coalescent agent and nanoparticles having an average diameter of less than or equal to about 500 nm. An object slice of a 3D object may be formed by exposing the infiltrated layer to a radiant energy (S103). The object slice may comprise a polymeric matrix comprising the polymeric particles, at least some of which are fused to one another, and the nanoparticles within the polymeric matrix. Finally, any combination of the processes S101 to S103 may be repeated to form the 3D object comprising multiple object slices bound depth-wise to one another. A printing system comprising various suitable devices, including an energy source, and a controller to execute (machine-readable) instructions to cause these devices to perform the aforementioned processes is also provided.

Figure 2:
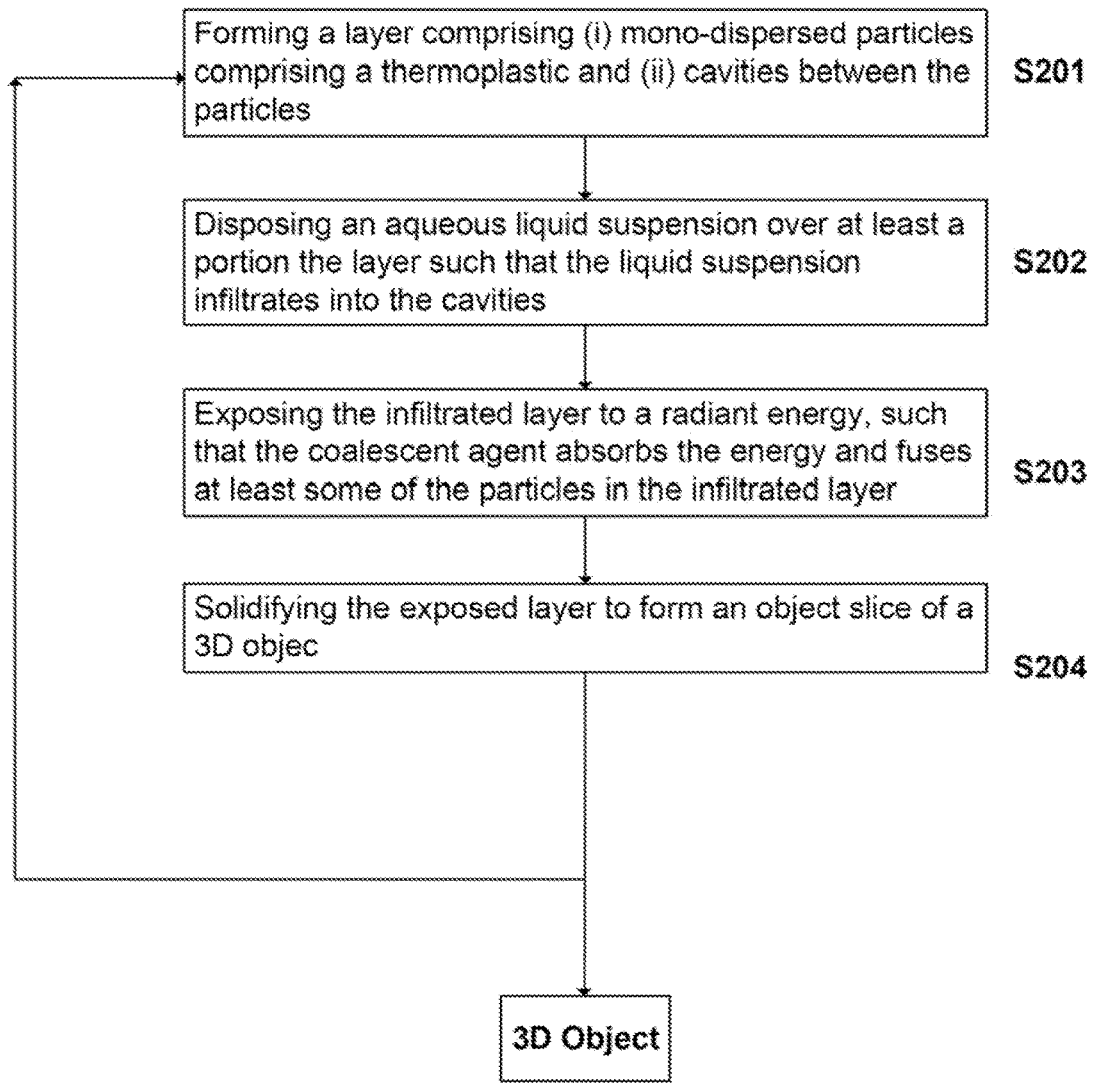
FIG. 2 provides a schematic flowchart illustrating another example of a 3D printing process described herein.

FIG. 2 illustrates another example of the processes in one LAP method. In this example, a layer comprising (i) mono-dispersed particles comprising a thermoplastic and (ii) cavities between the particles is formed (S201). The particles may have an average diameter of between about 10 µm and about 150 µm. Subsequently, an aqueous liquid suspension is disposed over at least a portion the layer such that the liquid suspension infiltrates into the cavities (S202). The liquid suspension may comprise a radiation-absorbing coalescent agent and nanoparticles having an average diameter of between about 50 nm and about 500 nm. Then the infiltrated layer is exposed to a radiant energy, such that the coalescent agent absorbs the energy and fuses at least some of the particles in the infiltrated layer (S203). Thereafter, the exposed layer is solidified to form an object slice of a 3D object (S204). The object slice may comprise a polymeric matrix comprising the fused particles and the nanoparticles within the polymeric matrix, and the object slice may be substantially free of the cavities. Finally, any combination of the processes S201 to S204 may be repeated to form the 3D object comprising multiple object slices bound depth-wise to one another. A printing system comprising various suitable devices, including an energy source, and a controller to execute (machine-readable) instructions to cause these devices to perform the aforementioned processes is also provided.

The sequence of sections presented in FIGS. 3A-3E illustrate one example of manufacturing a three-dimensional object 44. An example of the 3D printing method using an example of the polymeric particle composition 10 disclosed herein is shown in FIGS. 3A through 3E. The 3D printing method as shown in FIGS. 3A-3E is an LAP method. In one example, during light area processing, an entire layer of the polymeric particle composition 10 is exposed to radiation, but only a selected region of the polymeric particle composition 10 is fused and hardened to become a layer of a 3D object. In another example, the entire region of the polymeric particle composition 10 is fused. In the example as shown in FIGS. 3A-3E, a coalescent agent is selectively deposited in contact with the selected region of the polymeric particle composition 10. The coalescent agent penetrates (partially or fully) into the layer of the polymeric particle composition 10 and infiltrates the cavities present in between the particles in the polymeric particle composition 10. The coalescent agent is capable of absorbing radiation and converting the absorbed radiation to thermal energy, which in turn melts or sinters the particles 12, 14, 16 that are in contact with the coalescent agent. This causes the polymeric particle composition 10 to fuse, bind, cure, etc. to form the layer of the 3D object.

As illustrated in FIGS. 3A-3E, the respective particles 12, 14, 16 of the polymeric particle composition 10 may be formed of the same type of polymer, or of different types of polymers, or some of the particles 12, 14 may be formed of the same type of polymer and the other particles 16 may be formed of a different type of polymer. The polymer may be any of those aforedescribed with respect to polymeric particles. It is noted that while particles 12, 14, and 16 are depicted in FIGS. 3A-3E as three different types (e.g., size, chemical compositions, etc.) for illustration purpose, the methods and the layers described herein need not have more than one type of particle. For example, the polymeric particle composition 10 may comprise mono-dispersed particles—i.e., particles 12, 14, and 16 have the same size. The particles 12, 14, and 16 may also have the same material chemistry.

Figure 3A:
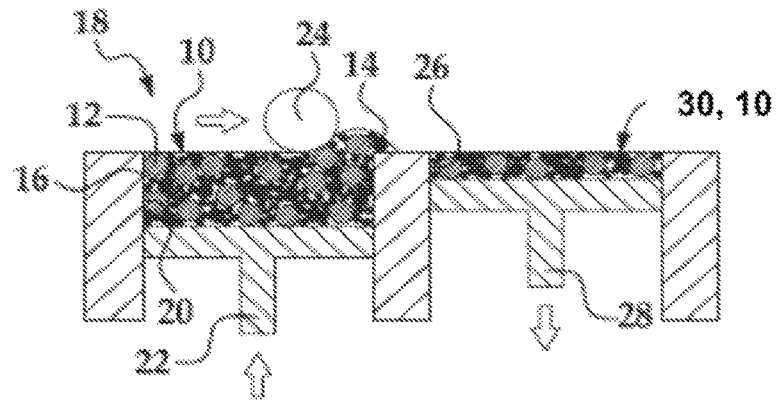
FIGS. 3A-3E provide schematic diagrams illustrating cross-sectional views of the processes involved in one example of forming object slices of a 3D object using an example of a 3D printing method described herein.

In the example shown in FIG. 3A, a printing system 18 for forming the 3D object includes a supply bed 20 (including a supply of the polymeric particle composition 10), a delivery piston 22, a roller 24, a fabrication bed 26, and a fabrication piston 28. Each of these physical elements may be operatively connected to a central processing unit (not shown) of the printing system 18. The central process unit may comprise, or be, a controller. The central processing unit (e.g., running machine readable instructions stored on a non-transitory, tangible machine readable storage medium) may manipulate and transforms data represented as physical (electronic) quantities within the printer's registers and memories in order to control the physical elements to create the 3D object. The machine herein may refer to a processor, such as a computer. The data for the selective delivery of the polymeric particle composition 10, the coalescent agent, etc. may be derived from a model of the 3D object to be formed.

The delivery piston 22 and the fabrication piston 28 may be the same type of piston, but are programmed to move in opposite directions. In one example, when a first object slice (layer) of the 3D object is to be formed, the delivery piston 22 may be programmed to push a predetermined amount of the polymeric particle composition 10 out of the opening in the supply bed 20, and the fabrication piston 28 may be programmed to move in the opposite direction of the delivery piston 22 in order to increase the depth of the fabrication bed 26. The delivery piston 22 may advance enough so that when the roller 24 pushes the polymeric particle composition 10 into the fabrication bed 26, the depth of the fabrication bed 26 is sufficient so that a layer 30 of the polymeric particle composition 10 may be formed over the bed 26 (acting as a substrate). In one example, the layer 30 disposed over the bed 26 may comprise a mono-layer of the polymeric particle composition 10. The roller 24 is capable of spreading the polymeric particle composition 10 into the fabrication bed 26 to form the layer 30, which may be relatively uniform in thickness. In one example, the thickness of the layer 30 ranges from about 90 µm to about 110 µm, although thinner or thicker layers may also be formed and employed.

The roller (coater) 24 may be replaced by, or employed in addition to, other tools, such as a blade coater that may be desirable for spreading different types of powders.

Figure 3B:
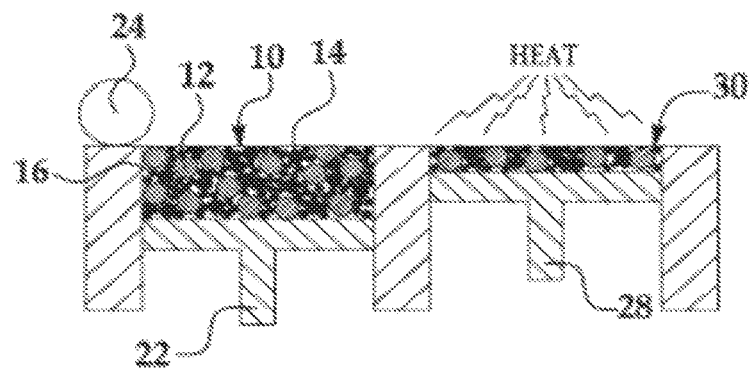

In this example, after the layer 30 comprising the polymeric particle composition 10 is formed over the fabrication bed 26, the layer 30 is exposed to heating (as shown in FIG. 3B). Heating may be performed to pre-heat the polymeric particle composition 10, and thus in some examples it is desirable that the heating temperature be below the lowest melting temperature of the polymeric particles 12, 14, 16 in the polymeric particle composition 10. For example, this temperature may be between about 2° C. below and about 100° C. below the melting temperature of the polymeric particles—e.g., between about 5° C. below and about 50° C. below, between about 10° C. below and about 30° C. below, etc. Other temperature values are also possible. As such, the temperature selected will depend upon the polymeric particle composition 10 that is employed. In one example, the (pre-) heating temperature ranges from about 50° C. to about 350° C. In another example, the heating temperature ranges from about 60° C. to about 170° C. Other temperatures are also possible.

Pre-heating the layer 30 of the polymeric particle composition 10 may be accomplished using any suitable heat source that exposes the polymeric particle composition 10 in the fabrication bed 26 to the heat. Examples of suitable heat sources include thermal or light radiation sources.

Figure 3C:
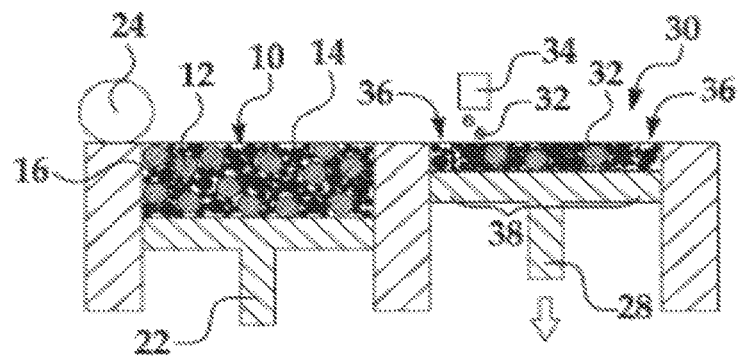

After pre-heating the layer 30, a liquid suspension 32 (e.g., of the aforementioned coalescent fluid), which may contain a coalescent agent and/or a plurality of nanoparticles, is selectively applied on at least a portion of the polymeric particle composition 10 in the layer 30, as shown in FIG. 3C. In one example, the liquid suspension 32 comprises a coalescent agent, such as any of those described herein, and nanoparticles, such as any of those described herein. An example of suitable liquid suspension 32 includes an aqueous dispersion containing at least one coalescent agent and nanoparticles. The coalescent agent may comprise a radiation absorbing binding agent and may be present at any of the amount described herein. As described above, examples of the coalescent agent include an infrared light absorber, a near infrared light absorber, or a visible light absorber. As one example, the coalescent agent may be an ink-type formulation including carbon black, such as, for example, the ink formulation commercially known as CM997A available from Hewlett-Packard Company. Examples of inks including visible light enhancers are dye-based colored ink and pigment-based colored ink, such as the commercially available inks CE039A and CE042A, available from Hewlett-Packard Company. In one example, as described above, the coalescent agent may be present at between about 1 wt % and about 4 wt %, relatively to the polymeric powders.

As illustrated in FIG. 3C, the liquid suspension 32 is dispensed from an inkjet distributor 34. The distributor 34 may be any suitable printhead, such as a thermal inkjet printhead or a piezoelectric inkjet printhead. The distributor 34 may comprise at least one printhead. While a single printhead is shown in FIG. 3C, multiple printheads may be used that span the width of the fabrication bed 26. The distributor 34 may be attached to a moving XY stage (not shown) that moves the distributor 34 adjacent to the fabrication bed 26 in order to dispose the liquid suspension 32 in desirable area(s) 38. The distributor 34 may be programmed to receive commands from the central processing unit, particularly the controller thereof, and to dispose the liquid suspension 32 according to a pattern for the first layer of the 3D object. The distributor 34 may selectively apply the liquid suspension 32 on those portions of the layer 30 that are to be fused to become the first layer of the 3D object. As an example, if the first layer is to be shaped like a cube or cylinder, the liquid suspension 32 will be deposited in a square pattern or a circular pattern (from a top view), respectively, on at least a portion of the layer 30 of the polymeric particle composition 10. In the example shown in FIG. 3C, the liquid suspension 32 is disposed, for example, in a square pattern over the area 38 of the layer 30 and not on the areas 36.

Not to be bound by any particular theory, but the aqueous nature of the liquid suspension 32 may enable the liquid suspension 32 to infiltrate, at least partially, into the polymeric powder particle composition layer 30. In particular, the liquid suspension 32 infiltrates into the cavities between the polymeric particles. While the liquid suspension 32 is described as aqueous in this example, non-aqueous suspensions may also be employed.

Figure 3D:
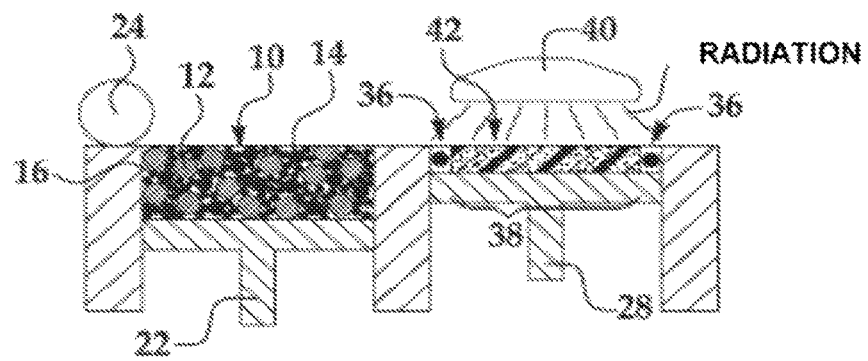

After the liquid suspension 32 is selectively applied in the desired area(s) 38, the entire layer 30 of the polymeric particle composition 10 and the liquid suspension 32 applied to at least a portion thereof are exposed to radiation. The application may involve at least one of a thermal inkjet printer and a piezoelectric inkjet printer. This is shown in FIG. 3D.

The energy source 40 may refer to any source that may emit an energy. The energy herein may comprise any suitable radiant energy, depending on the application. For example, the energy may comprise at least one of infrared-light, halogen light, microwave, and laser heating. The radiation-energy is emitted from an energy source 40, such as an IR, near-IR, UV, or visible curing lamp, IR, near-IR, UV, or visible light emitting diodes (LED), or lasers with specific wavelengths. The energy source 40 employed may depend, at least in part, on the type of liquid suspension 32, particularly the coalescent agent, that is used. The energy source 40 may be attached, for example, to a carriage that also holds the distributor(s) 34. The carriage may move the energy source 40 into a position that is adjacent to the fabrication bed 26. The energy source 40 may be programmed to receive commands from the central processing unit and to expose the layer 30 and liquid suspension 32 to radiation. The length of time the radiation is applied for, or energy exposure time, may be dependent, for example, on at least one of: characteristics of the energy source 40; characteristics of the polymeric power material 10; and characteristics of the liquid suspension 32.

The energy source 40 may apply light, as an example of radiant energy, to the polymeric particles to cause the solidification of portions of the polymeric particles according to where coalescent agent has been delivered or has penetrated. In some examples, the light source is an infra-red (IR) or a near infra-red light source, or a halogen light source. The light source may be a single light source or an array of multiple light sources. In some examples, the light source is configured to apply light energy in a substantially uniform manner simultaneously to the whole surface of a layer of polymeric particles. In other examples, the light source is configured to apply energy to only certain area(s)

of the whole surface of a layer of polymeric particles. In these examples, light source may be moved or scanned across the layer of polymeric particles, such that a substantially equal amount of energy is applied to the selected areas or across the whole surface of a layer of polymeric particles.

The length of time the radiation is applied for, or the energy exposure time, may be dependent, for example, on one or more of: characteristics of the radiation source; characteristics of the materials involved (e.g., polymeric particles and coalescent agent).

It is to be understood that variations in the fusing level may be achieved by altering (increasing or decreasing) the energy exposure time along the X, Y, and/or Z axes. As an example, if it is desirable that the level of fusing decrease along the Z axis, the radiation exposure time may be the highest in the first layer and decrease in subsequently formed layers. In yet another example, variations in the level of fusing may be achieved by altering (increasing or decreasing) the amount of coalescent agent that is applied along the X, Y, and/or Z axes.

The coalescent agent may enhance the absorption of the radiation, convert the absorbed radiation to thermal energy, and/or promote the transfer of the thermal heat to the polymeric particle composition 10 in contact therewith (i.e., in the area 38). In one example, the coalescent agent sufficiently elevates the temperature of the polymeric particle composition 10 in the area 38 above the melting temperature(s), allowing curing (e.g., sintering, binding, fusing, etc.) of the particles 12, 14, 16 to take place. The coalescent agent may also cause, for example, heating of the polymeric particle composition 10 below its melting temperature but to a temperature suitable to cause softening and bonding of the particles 12, 14, 16. It is to be understood that area(s) 36 not having the coalescent agent applied thereto absorb less energy, and thus the polymeric particle composition 10 within these area(s) 36 generally does not exceed the melting temperature(s) of the particles 12, 14, 14, and does not cure. This causes one layer 42 of the 3D object 44 (see FIG. 3E) to be formed.

The steps shown and described in reference to FIGS. 3A through 3D may be repeated as many times as desirable to create subsequent layers 46, 48, 50 (FIG. 3E) and finally to form the 3D object 44. Heat absorbed during the application of energy from a portion of the polymeric particle composition 10 on which a coalescent agent has been delivered or has penetrated may propagate to a previously solidified layer, such as layer 42, causing at least some of that layer to heat up above its melting temperature. Not to be bound by any particular theory, but this effect may help create strong interlayer bonding between adjacent layers of the 3D object 44.

Figure 3E:
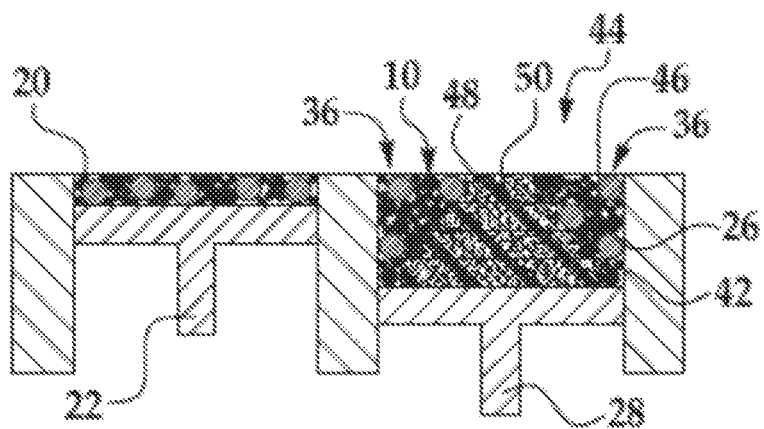

FIG. 3E illustrates one example of the 3D object 44. However, the subsequently formed layers 46, 48, 50 may have any desirable shape and/or thickness and may be the same as or different from any other layer 42, 46, 48, 50 depending upon the size, shape, etc. of the 3D object 44 that is to be formed.

As illustrated in FIG. 3E, as subsequent layers 46, 48, 50 are formed, the delivery piston 22 is pushed closer to the opening of the delivery bed 20, and the supply of the polymeric particle composition 10 in the delivery bed 20 is diminished (compared, for example, to FIG. 3A at the outset of the method). The fabrication piston 28 is pushed further away from the opening of the fabrication bed 26 in order to accommodate the subsequent layer(s) of polymeric particle composition 10 and selectively applied liquid suspension 32 containing the coalescent agent and nanoparticles. Since at least some of the polymeric particle composition 10 remains uncured after each layer 42, 46, 48, 50 is formed in this example, the 3D object 44 is at least partially surrounded by the uncured polymeric particle composition 10 in the fabrication bed 26.

When the 3D object 44 is formed, it may be separated and removed from the fabrication bed, and the uncured polymeric particle composition 10 remaining in the fabrication bed 26 may be reused.

In one example, the combination of polymeric particles, coalescing and coalescence modifier agents, and light energy may be selected for an object slice so that (1) polymeric particles with no coalescent agent does not coalesce when the energy is applied, (2) polymeric particles with only coalescent agent solidifies when energy is applied; or (3) polymeric particles with both agents undergo a modified degree of coalescence between no coalescence and solidification with or without the application of energy.

Figure 4:
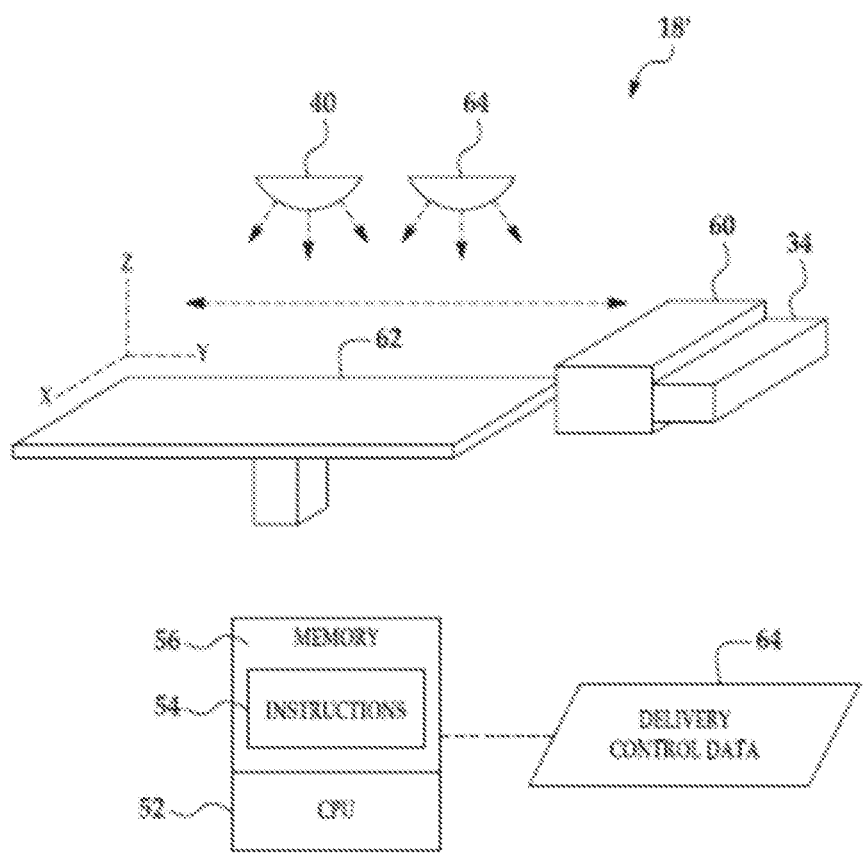
FIG. 4 is a simplified isometric view of an example of a 3D printing system that may be used In one example of the 3D printing method as disclosed herein.

Referring to FIG. 4, another example of the printing system 18' is depicted. The system 18' includes a central processing unit 52 that controls the general operation of the additive printing system 18'. As an example, the central processing unit 52 may comprise a controller, such as a microprocessor-based controller, that is coupled to a memory 56, for example using a communications bus (not shown). The memory 56 may store the machine (e.g., computer) readable instructions 54. The central processing unit 52 may execute the instructions 54, and thus may control operation of the system 18' in accordance with the instructions 54.

In this example, the printing system 18' includes a coalescent agent distributor 34 to selectively deliver a coalescent fluid comprising a coalescent agent and nanoparticles (e.g., in a liquid suspension) to a layer (not shown in this figure) of polymeric particles provided on a support member 62. In one example, the support member 62 has dimensions ranging from about 10 cm by about 10 cm up to about 100 cm by about 100 cm, although the support member 62 may have larger or smaller dimensions depending upon the 3D object 44 that is to be formed.

The central processing unit 52 may control the selective delivery of the coalescent agent and/or nanoparticles to the layer of the polymeric particles in accordance with delivery control data 64.

In the example shown in FIG. 4, the distributor 34 is a printhead, such as a thermal printhead or a piezoelectric inkjet printhead. The distributor 34 may be a drop-on-demand printhead or a continuous drop printhead.

The distributor 34 may be used to deliver selectively the coalescent fluid, including a coalescent agent and nanoparticles, when in the form of a suitable fluid, such as in a liquid suspension. As such, in some example, the coalescent agent may include a liquid carrier, such as water and/or any other suitable solvent and/or dispersant, to enable it to be delivered via the distributor 34.

In one example, the distributor 34 is selected to deliver drops of the liquid suspension containing coalescent agent and nanoparticles at a resolution ranging from about 300 dots per inch ("DPI") to about 1200 DPI. In another example, the distributor 34 is selected to be able to deliver drops of the liquid suspension at a higher or lower resolution.

The distributor 34 may include an array of nozzles through which the distributor 34 is able to selectively eject drops of fluid. In one example, each drop may be in the order of about 10 pico liters (pl) per drop, although it is contemplated that a higher or lower drop size may be used. In some examples, distributor 34 is able to deliver variable size drops.

The distributor 34 may be an integral part of the printing system 18', or they may be user replaceable. When the distributor 34 is user replaceable, it may be removably insertable into a suitable distributor receiver or interface module (not shown).

In another example of the printing system 18', a single inkjet printhead is employed to deliver selectively different types of the coalescent agents in one or multiple liquid suspensions. For example, a first set of printhead nozzles of the printhead may be configured to deliver one type of coalescent agent, and a second set of printhead nozzles of the printhead may be configured to deliver another type of coalescent agent.

As shown in FIG. 4, the distributor 34 has a length that enables it to span the whole width of the support member 62 in a page-wide array configuration. In one example, the page-wide array configuration is achieved through a suitable arrangement of multiple printheads. In another example, the page-wide array configuration is achieved through a single printhead with an array of nozzles having a length to enable it to span the width of the support member 62. In other examples of the printing system 18', the distributor 34 may have a shorter length that does not enable it to span the whole width of the support member 62.

While not shown in FIG. 4, the distributor 34 may be mounted on a movable carriage to enable it to move bi-directionally across the length of the support member 62 along the illustrated y-axis. This may enable selective delivery of the liquid suspension across the whole width and length of the support member 62 in a single pass. In other examples, the distributor 34 may be fixed while the support member 62 is configured to move relative thereto.

As used herein, the term "width" may refer to the shortest dimension in the plane parallel to the x and y axes shown in FIG. 4, and the term "length" to the longest dimension in this plane. However, it is to be understood that in another example the term "width" may be interchangeable with the term "length." As an example, the distributor 34 may have a length that enables it to span the whole length of the support member 62 while the movable carriage may move bi-directionally across the width of the support member 62.

In examples in which the distributor 34 has a shorter length that does not enable them to span the whole width of the support member 62, the distributor 34 may also be movable bi-directionally across the width of the support member 62 in the illustrated x-axis. This configuration may enable selective delivery of the liquid suspension across the whole width and length of the support member 62 using multiple passes.

The distributor 34 may include therein a supply of the liquid suspension, or may be operatively connected to a separate supply of the liquid suspension 32.

As shown in FIG. 4, the printing system 18' also includes a polymeric particle composition distributor 60. This distributor 60 is used to provide the layer (e.g., layer 30) of the polymeric particle composition 10 on the support member 62. Suitable polymeric particle composition distributors 60 may include, for example, a wiper blade and a roller.

The polymeric particle composition 10 may be supplied to the polymeric particle composition distributor 60 from a hopper or other suitable delivery system. In the example shown, the polymeric particle composition distributor 60 moves across the length (y-axis) of the support member 62 to deposit a layer of the polymeric particle composition 10.

As previously described, a first layer of polymeric particle composition 10 will be deposited on the support member 62, whereas subsequent layers of the polymeric particle composition 10 will be deposited on a previously deposited (and solidified) layer.

The support member 62 may also be movable along the z-axis. In one example, the support member 62 is moved in the z-direction such that as new layers of polymeric particle composition 10 are deposited, a predetermined gap is maintained between the surface of the most recently formed layer and the lower surface of the distributor 34. In another example, however, the support member 62 is fixed along the z-axis, and the distributor 34 may be movable along the z-axis.

Similar to the system 18 as shown in FIGS. 3A-3E, the system 18' also includes the energy source 40 to apply energy to the deposited layer of polymeric powder material 10 and the liquid suspension 32 to cause the solidification of portion(s) 38 of the polymeric powder material 10. Any of the previously described energy sources 40 may be used. In one example, the energy source 40 is a single energy source that is able to uniformly apply energy to the deposited materials, and in another example, energy source 40 includes an array of energy sources to uniformly apply energy to the deposited materials.

In the examples disclosed herein, the energy source 40 is configured to apply energy in a substantially uniform manner to the entire surface of the deposited polymeric particle composition 10. This type of energy source 40 may be referred to as an unfocused energy source. Exposing the entire layer to energy simultaneously may help increase the speed at which a three-dimensional object may be generated.

While not shown, it is to be understood that the energy source 40 may be mounted on the movable carriage or may be in a fixed position.

The central processing unit 52 may control the energy source 40. The amount of energy applied may be in accordance with delivery control data 64.

The system 18' may also include a pre-heater 64 that is used to pre-heat the deposited polymeric powder material 10 (as shown and described in reference to FIG. 3B). The use of the pre-heater 64 may help reduce the amount of energy that has to be applied by the energy source 40.

Figure 5:
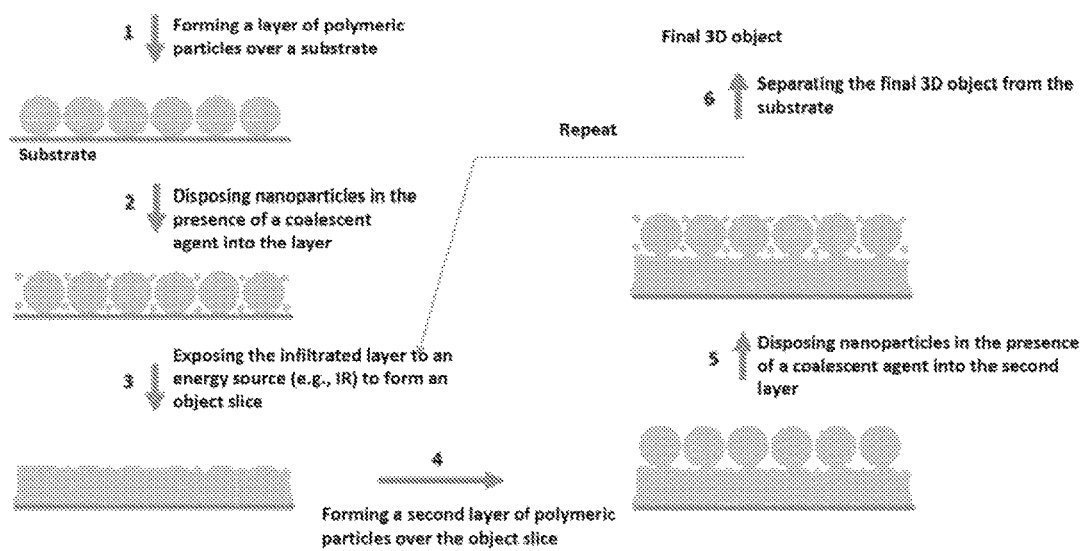
FIG. 5 provides a flowchart describing processes involved in one example of an LAP method described herein.

FIG. 5 describes the processes involved in another example of a 3D printing method described herein. The following steps are meant to capture the information provided in the figure and are not meant to be limiting:

Step 1: A pulverulent layer comprising polymeric particles is formed over a substrate. The layer may be formed over a substrate. A regular roller coater and/or a blade coater may be employed for the formation. The pulverulent layer may comprise any of the polymeric particles as described above and cavities between the particles. The polymeric particles may have any of the aforedescribed sizes. In one example, the particles comprise a polyamide, such as PA-12. In one example, the particles have an average size of between about 5 µm and about 250 µm—e.g., between about 10 µm and about 150 µm. In this example, mono-dispersed polymeric particles of a pre-designated size are employed. As an illustrative example, if 100 µm particles are used and the layer thickness is set to be 100 µm, it is to be expected that the layer would comprise a monolayer of such particles, as shown in FIG. 5.

Step 2: A liquid suspension comprising a coalescent agent, as any of those described above, and nanoparticles, as any of those described above, is disposed over at least a portion of the pulverulent layer. The disposition may involve inkjet printing. The inkjet printing may involve at least one of a thermal printer and a piezoelectric printer, as described above. The liquid suspension may infiltrate into the cavities of the layer. The infiltrating liquid suspension, particularly the nanoparticles therein, may fill the cavities in the layer. The coalescent agent may infiltrate the layer and be in close proximity to both the polymeric particles and the nanoparticles.

The coalescent may comprise any suitable material, such as any of those described herein. In one example, the coalescent agent comprises at least one of a carbon black and an NIR dye at between about 1 wt % and about 4 wt %. The nanoparticles may comprise the same or different material as/from the polymeric particles. The nanoparticles may be spherical nanoparticles. The nanoparticles may be present at any suitable loading value in the liquid suspension (of the coalescent fluid), such as any of the amount described herein. For example, in this example, the nanoparticles and the polymeric particles both comprise a thermoplastic. In this example, the thermoplastic is PA-12. In this example, to form a dense PA-12 layer, 50 µm PA-12 particles are employed to form the base layer (step 1), followed by jetting a liquid suspension comprising a coalescent agent, as any of those described above (e.g., comprises at least one of a carbon black and an NIR dye at between about 1 wt % and about 4 wt %) and PA-12 nanoparticles (about 50-500 nm, about 10-40 wt % loading with respect to the liquid suspension) onto the base layer. In another example, a different material composition constitutes the nanoparticles which serve to modulate the final properties of the 3D parts. In this example, to form a glass-filled PA-12 layer, 50 µm PA-12 particles are employed to form the base layer (step 1), followed by jetting of a liquid suspension comprising a coalescent agent, as any of those described above (e.g., comprises at least one of a carbon black and an NIR dye at between about 1 wt % and about 4 wt %) and nanoparticles comprising a glass (e.g., silica) (about 50-500 nm, about 10-40 wt % loading with respect to the liquid suspension).

The densification of the object slice (and/or also the final resultant 3D object) may be achieved by at least interfiltration and/or packing of the nanoparticles in between the voids in the pulverulent layer. Not to be bound by any particular theory, but the presence of the nanoparticles in the voids may mitigate, minimize, or even prevent, shrinkage of the object slice (and/or the final 3D object) during fusing of the polymeric particles in the pulverulent layer. As a result, the object slice and/or also the final resultant 3D object may have a high compaction level, such as at least 0.5—e.g., greater than about 0.6, about 0.7, about 0.8, about 0.9, about 0.95, about 0.99, or higher. The compaction level may refer to volumetric % of the particles in a material; or in corollary, the lack of voids/cavities present in a material. Other values are also possible.

Figure 6:
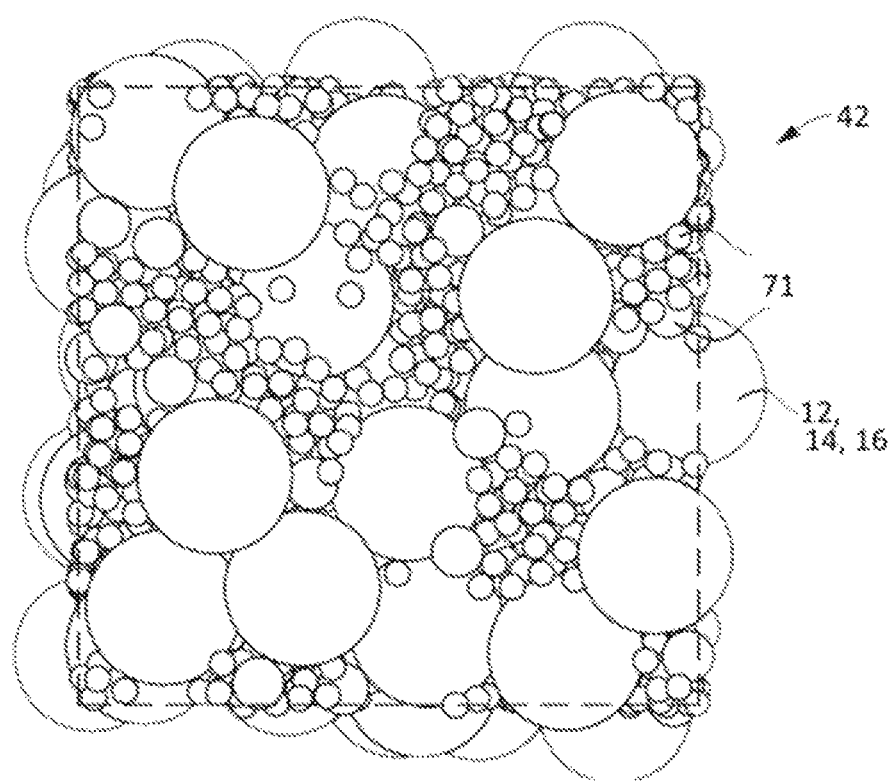
FIG. 6 provides a schematic illustrating, in one example, the cross-section of an object slice comprising micrometer-sized polymeric particles and a plurality of nanoparticles located between the polymeric particles.

Step 3: The layer is exposed to a radiation energy such that an object slice (of the final 3D object) is formed. The radiation may be, for example, electromagnetic irradiation, including any of those described above, such as IR source, microwave, and laser heating element. The radiant energy may selectively cause fusing to one another at least one of (i) the polymeric particles (e.g., thermoplastic), (ii) the nanoparticles, and (iii) a combination of (i) and (ii). Due at least in part to the nanoparticles, in-situ densification of the layer is achieved. FIG. 6 illustrates one example of the cross-sectional view of an object slice described herein. As shown FIG. 6, the schematic, the object slice 42 comprises nanoparticles 71 located between the micrometer-sized polymeric particles 12, 14, 16. While FIG. 6 shows that the nanoparticles have different sizes, the nanoparticles 71 may have the same size. Also, FIG. 6 shows that the micrometer-sized polymeric particles 12, 14, 16 as having the same size in this example, but as noted before, this need not be the case.

Step 4 and Step 5 are repetition of steps 1 and 2. In particular, steps 1, 2, and 3 may be repeated until a 3D object is formed.

Step 6: The final resultant 3D object is separated from the substrate. Any suitable technique of separating may be employed.

In one example of this process, a thin layer of nylon powder is spread and heated to close to 150° C. Then it was printed with a liquid suspension containing carbon black as the coalescent agent where the part has to be formed. It was exposed to a light source wherein carbon black absorbs energy and converts it to thermal energy. As a result, the powder reaches to its melting temperature and fuses to form the cross section. More layers are fabricated until the desired final 3D object is formed. In some instances, at least one modifier agent is added to mitigate thermal bleed so as to improve the surface quality.

Additional processing may also be employed. For example, the process may comprise disposing a modifier agent to at least one of the object slice and the 3D object to mitigate thermal bleed. The modifier agent may be any of those aforedescribed. The modifier agent may be applied to, for example, around the perimeter of the cross section of at least one of one of the object slice and the 3D object. Also, the process method may further comprise separating the 3D object from the substrate. The separation may be carried out at any temperature. For example, the 3D object may be removed from the substrate when the temperature of the 3D subject is lower than about 200° C.—e.g., lower than about 180° C., or lower. Depending on the application, particularly the materials involved, other temperatures are also possible. Also, the method may further comprise removing from the object slice (or the final 3D object) particles that are not fused. The removal may be accomplished by any suitable process. For example, the removal may involve by at least one of brushing, water-jet cleaning, sonic cleaning, and blasting.

Resultant 3D Object

The methods and systems described herein may be employed to obtain dense polymeric powder layer while not affecting the infiltration of a coalescent agent. In one example, the methods described herein achieve in-situ layer densification having the densification ratio as described herein. The term "densification ratio" may refer to the level of compaction (e.g., density) achieved divided by the target compaction level (e.g., density). The high densification ratio facilitates ensuring good fusing of the particles within the layer and/or between multiple layers. In the methods and systems described herein, the main constituents of a powder layer are separated into at least two portions: (i) polymeric particles and (ii) nanoparticles that may or may not comprise a polymer. As described herein, the polymeric particles may be mono-dispersed particles. The nanoparticles are present in the coalescent agent containing liquid suspension. During an LAP method, the aforementioned at least two separate constituents are combined to facilitate layer compaction and in-situ densification. Not to be bound by any particular theory, but capillary action may ensure good sedimentation and packing of the nanoparticles among the cavities within a layer and/or uniform distribution of the coalescent agent. The methods described herein may mitigate, minimize, or even prevent, volumetric shrinkage and surface roughness of the final 3D parts. Additionally, by selecting the appropriate combination of the nanoparticles and the base polymeric particles, the methods described herein allow tailoring the mechanical property of the final 3D object.

The high density of the layer may be reflected in the low porosity thereof. The densification ratio of the layer may be at least about 0.6—e.g., at least about 0.7, about 0.8, about 0.9, about 0.95, about 0.99, or higher. In one example, the porosity of the layer is lower than about 50 (volume) %—e.g., lower than about 40%, about 30%, about 20%, about 10%, about 5%, about 1%, about 0.5%, or lower. The 3D object may have the same or different density value as/from the layer. In one example, the object slice and/or 3D object are at least substantially free of cavities. In one example, the object slice has a densification ratio of at least about 0.80—e.g., at least about 0.85, about 0.90, about 0.95, about 0.99, or higher.

Additional Notes

All literature and similar material cited in this application, including, but not limited to, patents, patent applications, articles, books, treatises, and web pages, regardless of the format of such literature and similar materials, are expressly incorporated by reference in their entirety. In the event that any of the incorporated literature and similar materials differs from or contradicts this application, including but not limited to defined terms, term usage, described techniques, or the like, this application controls.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways. For example, some examples may be implemented using hardware, software or a combination thereof. When any aspect of an example is implemented at least in part in software, the software code may be executed on any suitable processor or collection of processors, whether provided in a single computer or distributed among multiple computers.

Various examples described herein may be embodied at least in part as a non-transitory machine-readable storage medium (or multiple machine-readable storage media)—e.g., a computer memory, a floppy disc, compact disc, optical disc, magnetic tape, flash memory, circuit configuration in Field Programmable Gate Arrays or another semiconductor device, or another tangible computer storage medium or non-transitory medium) encoded with at least one machine-readable instructions that, when executed on at least one machine (e.g., a computer or another type of processor), cause at least one machine to perform methods that implement the various examples of the technology discussed herein. The computer readable medium or media may be transportable, such that the program or programs stored thereon may be loaded onto at least one computer or other processor to implement the various examples described herein.

The term "machine-readable instruction" are employed herein in a generic sense to refer to any type of machine code or set of machine-executable instructions that may be employed to cause a machine (e.g., a computer or another type of processor) to implement the various examples described herein. The machine-readable instructions may include, but not limited to, a software or a program. The machine may refer to a computer or another type of processor. Additionally, when executed to perform the methods described herein, the machine-readable instructions need not reside on a single machine, but may be distributed in a modular fashion amongst a number of different machines to implement the various examples described herein.

Machine-executable instructions may be in many forms, such as program modules, executed by at least one machine (e.g., a computer or another type of processor). Generally, program modules include routines, programs, objects, components, data structures, etc. that perform particular tasks or implement particular abstract data types. Typically, the functionality of the program modules may be combined or distributed as desired in various examples.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

All definitions, as defined and used herein, should be understood to control over dictionary definitions, definitions in documents incorporated by reference, and/or ordinary meanings of the defined terms.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure, including the claims, are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Concentrations, amounts, and other numerical data may be expressed or presented herein in a range format. Such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 weight % (wt %) to 5 wt %" should be interpreted to include not only the explicitly recited values of 1 wt % to 5 wt %, but also include individual values and sub-ranges within the indicated range. Thus, included in this numerical range are individual values, such as 2, 3.5, and 4, and sub-ranges, such as from 1-3, from 2-4, and from 3-5, etc. This same principle applies to ranges reciting only one numerical value. Furthermore, such an interpretation should apply regardless of the breadth of the range or the characteristics being described.

The phrase "and/or," as used herein in this disclosure, including the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one example, to A only (optionally including elements other than B); in another example, to B only (optionally including elements other than A); in yet another example, to both A and B (optionally including other elements); etc.

As used in this disclosure, including the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in this disclosure, including the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including elements other than B); in another example, to at least one, optionally including more than one, B, with no A present (and optionally including elements other than A); in yet another example, to at least one, optionally including more than one, A, and at least one, optionally including more than one, B (and optionally including other elements); etc.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

The claims should not be read as limited to the described order or elements unless stated to that effect. It should be understood that various changes in form and detail may be made by one of ordinary skill in the art without departing from the spirit and scope of the appended claims. All examples that come within the spirit and scope of the following claims and equivalents thereto are claimed.

What is claimed:

1. A three-dimensional ("3D") printing method, comprising:
   (A) forming a layer comprising (i) mono-dispersed particles comprising a first polymer and (ii) cavities between the particles, wherein the particles have an average diameter of between about 5 µm and about 250 µm;
   (B) disposing a liquid suspension over at least a portion of the layer such that the liquid suspension infiltrates into the cavities, wherein the liquid suspension comprises a radiation-absorbing coalescent agent and nanoparticles having an average diameter of less than or equal to about 300 nm, wherein the nanoparticles comprise a second polymer selected from the group consisting of a polyamide, a polystyrene, a polyethylene, a polyacetal, a polypropylene, a polycarbonate, and a polyurethane;
   (C) forming an object slice of a 3D object by exposing the infiltrated layer to a radiant energy, wherein the object slice comprises a polymeric matrix comprising the particles, at least some of which are fused to one another, and the nanoparticles within the polymeric matrix; and
   (D) repeating (A) to (C) to form the 3D object comprising multiple object slices bound depth-wise to one another.

2. The 3D printing method of claim 1, wherein the first polymer comprises a polyamide having a weight-average molecular weight ranging from about 70,000 to about 300,000.

3. The 3D printing method of claim 1, wherein the first polymer comprises at least one of thermoplastic polyurethane, PA-11, PA-12, PA-6, PA-8, PA-9, PA-66, PA-612, PA-812, and PA-912.

4. The 3D printing method of claim 1, wherein the first polymer comprises at least one of a polyamide, a polystyrene, a polyethylene, a polyacetal, a polypropylene, a polycarbonate, and a polyurethane.

5. The 3D printing method of claim 1, further comprising removing from the object slice particles that are not fused by at least one of brushing, water-jet cleaning, sonic cleaning, and blasting.

6. The 3D printing method of claim 1, further comprising heating the layer to a temperature between about 5° C. below and about 50° C. below a melting temperature of the first polymer before (B).

7. A three-dimensional ("3D") printing method, comprising:
   (A) forming a layer comprising (i) mono-dispersed particles comprising a first thermoplastic and (ii) cavities between the particles, wherein the particles have an average diameter of between about 10 µm and about 150 µm;
   (B) disposing an aqueous liquid suspension over at least a portion the layer such that the liquid suspension infiltrates into the cavities, wherein the liquid suspension comprises a radiation-absorbing coalescent agent and nanoparticles having an average diameter of between about 50 nm and about 500 nm, wherein the nanoparticles comprise a second thermoplastic;
   (C) exposing the infiltrated layer to a radiant energy, such that the coalescent agent absorbs the energy and fuses at least some of the particles in the infiltrated layer;
   (D) solidifying the exposed layer to form an object slice of a 3D object, wherein the object slice comprises a polymeric matrix comprising the fused particles and the nanoparticles within the polymeric matrix, and wherein the object slice is at least substantially free of the cavities; and (E) repeating (A) to (C) to form the 3D object comprising multiple object slices bound depth-wise to one another.

8. The 3D printing method of claim 7, further comprising fusing to one another at least one of (i) the particles, (ii) the nanoparticles, and (iii) a combination of (i) and (ii).

9. The 3D printing method of claim 7, wherein the first thermoplastic is the same as the second thermoplastic.

10. The 3D printing method of claim 7, further comprising disposing a modifier agent to at least one of (i) the object slice and (ii) the three-dimensional object to mitigate thermal bleed.

11. A three-dimensional ("3D") printing system, comprising:
- a supply of mono-dispersed particles comprising a first polymer and (ii) cavities between the particles, wherein the particles have an average diameter of between about 5 µm and about 250 µm;
- a first device to form a layer of the mono-dispersed particles;
- a supply of a liquid suspension comprising a radiation-absorbing coalescent agent and nanoparticles having an average diameter of less than or equal to about 300 nm, wherein the nanoparticles comprise a second polymer selected from the group consisting of a polyamide, a polystyrene, a polyethylene, a polyacetal, a polypropylene, a polycarbonate, and a polyurethane;
- a second device to dispose the liquid suspension;
- an energy source to apply a radiant energy; and
- a controller to execute instructions to:
  - cause the first device to form the layer;
  - cause the second device to dispose over at least a portion of the layer the liquid suspension such that the liquid suspension infiltrates into the cavities; and
  - cause the energy source to apply the radiant energy to the infiltrated layer to form an object slice of a 3D object, wherein the object slice comprises a polymeric matrix comprising the particles, some of which are fused to one another, and the nanoparticles within the polymeric matrix.

12. The 3D printing system of claim 11, wherein the second device comprises at least one of a thermal inkjet printer and a piezoelectric inkjet printer.

13. The 3D printing method of claim 7, wherein each of the first and second thermoplastics comprises at least one of thermoplastic polyurethane, PA-11, PA-12, PA-6, PA-8, PA-9, PA-66, PA-612, PA-812, and PA-912.

14. A three-dimensional ("3D") printing method, comprising:

(A) forming a layer comprising (i) mono-dispersed particles comprising a polymer and (ii) cavities between the particles, wherein the particles have an average diameter of between about 5 µm and about 250 µm;

(B) disposing a liquid suspension over at least a portion of the layer such that the liquid suspension infiltrates into the cavities, wherein the liquid suspension comprises a radiation-absorbing coalescent agent and nanoparticles having an average diameter of less than or equal to about 300 nm, wherein the nanoparticles comprise the same material as the particles;

(C) forming an object slice of a 3D object by exposing the infiltrated layer to a radiant energy, wherein the object slice comprises a polymeric matrix comprising the polymeric particles, at least some of which are fused to one another, and the nanoparticles within the polymeric matrix; and (D) repeating (A) to (C) to form the 3D object comprising multiple object slices bound depth-wise to one another.

15. The 3D printing method of claim 10, wherein the modifier agent includes an inorganic salt, a surfactant, a co-solvent, a humectant, a biocide, and water.

* * * * *